United States Patent
Hay et al.

(10) Patent No.: US 10,766,986 B2
(45) Date of Patent: Sep. 8, 2020

(54) ACID RESISTANT POLYETHYLENE CONTAINERS

(71) Applicant: NOVA Chemicals (International) S.A., Fribourg (CH)

(72) Inventors: Henry Hay, Calgary (CA); Derek Wasylenko, Calgary (CA); Tony Tikuisis, Calgary (CA); Gilbert Arnould, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 239 days.

(21) Appl. No.: 16/052,909

(22) Filed: Aug. 2, 2018

(65) Prior Publication Data

US 2020/0040114 A1 Feb. 6, 2020

(51) Int. Cl.
| | |
|---|---|
| C08F 210/02 | (2006.01) |
| C08K 5/13 | (2006.01) |
| C08K 5/17 | (2006.01) |
| C08K 5/524 | (2006.01) |
| B65D 85/84 | (2006.01) |
| B29C 41/04 | (2006.01) |
| B29C 41/00 | (2006.01) |
| B29K 105/00 | (2006.01) |
| B29L 31/00 | (2006.01) |

(52) U.S. Cl.
CPC .......... C08F 210/02 (2013.01); B29C 41/003 (2013.01); B29C 41/042 (2013.01); B65D 85/84 (2013.01); C08K 5/13 (2013.01); C08K 5/17 (2013.01); C08K 5/524 (2013.01); B29K 2023/06 (2013.01); B29K 2105/0014 (2013.01); B29K 2105/0044 (2013.01); B29K 2105/0085 (2013.01); B29L 2031/712 (2013.01); C08K 2201/014 (2013.01)

(58) Field of Classification Search
CPC .... C08F 210/02; B29C 41/003; B29C 41/042
See application file for complete search history.

(56) References Cited

U.S. PATENT DOCUMENTS 7,201,864 B2 *  4/2007  Weber .................. B29C 41/003
                                                    264/310

* cited by examiner

*Primary Examiner* — Jacob T Minskey
*Assistant Examiner* — Melody Tsui
(74) *Attorney, Agent, or Firm* — Lawrence T. Kale

(57) ABSTRACT

Rotomolded polyethylene containers that are used to store sulfuric acid can become discolored on the interior surface which is in contact with the acid. This problem may be mitigated by the use of an additive package that contains two primary antioxidants.

8 Claims, No Drawings

ACID RESISTANT POLYETHYLENE CONTAINERS

This disclosure provides a rotomolded polyethylene container that is resistant to discoloration when contacted with sulfuric acid.

Rotational molding, also known as rotomolding, is a well-known process which is widely used to produce hollow plastic parts such as gasoline containers, garbage cans, agricultural storage vessels, septic tanks and sporting goods such as kayaks. The process is undertaken by loading a charge of finely divided plastic copolymer into the mold "shell", then rotating the mold (usually, on two axes) while heating it to a temperature above the melting point of the plastic copolymer. The melted plastic flows through the mold cavity under the forces caused by the rotation of the apparatus. The rotation continues for sufficient time to allow the molten plastic to cover the surface of the mold. The mold is then cooled to permit the plastic to freeze into a solid. The final stage of the molding cycle is the removal of the part from the rotomolding machine.

The time required to complete the molding cycle is a function of the bulk properties of the plastic which is being molded. For example, it is recognized by those skilled in the art that the plastic copolymer which is charged into the mold is preferably finely divided (i.e. ground into powder) and has a high bulk density and a narrow particle size distribution to facilitate the "free flow" of the copolymer.

It will also be appreciated that the physical properties of the rotomolded part are influenced by the use of a proper molding cycle time with "undercooked" parts having poor strength properties and "overcooked" parts suffering from poor appearance (a "burnt" color) and/or a deterioration of strength properties. It is desirable to have a short molding cycle (so as to improve the productivity of the expensive rotomolding machinery) and a broad "processing window" (i.e., the rotomolding composition ideally provides "properly cooked" parts in a short period of time but does not become "overcooked" for an extended period of time).

In addition, the properties of the rotomolded part are affected by the molecular structure of the polymer used to prepare the part. Physical properties of importance include stiffness (as indicated by the modulus of the part), environmental stress crack resistance (or "ESCR"), impact resistance and resistance to warpage.

Thermoplastic ethylene copolymer is a commonly used plastic copolymer for the manufacture of rotomolded parts. Conventional ethylene copolymer (which is generally prepared by the copolymerization of ethylene with a $C_{4\ to\ 10}$ alpha olefin in the presence of a chromium catalyst or a Ziegler Natta catalyst) is typically used. The alpha olefin comonomer produces "short chain branches" (SCB) in the copolymer. These SCB reduce the crystallinity of the copolymer (in comparison to a linear ethylene homopolymer) and the copolymers typically have improved impact resistance in comparison to homopolymers. These conventional "polyethylenes" may be referred to as "heterogeneous" in the sense that the polyethylene is actually a mixture of different polyethylene chains having significantly different molecular weights and comonomer distributions. Most notably, a conventional heterogeneous ethylene copolymer generally contains three fractions:

i) a low molecular weight fraction having a high comonomer content (or high level of SCB)—this fraction is often referred to as "wax" or "extractables";

ii) a very high molecular weight fraction having essentially no comonomer—this fraction is often referred to as "homopolymer"; and iii) a fraction of intermediate molecular weight and SCB content.

These conventional polyethylenes are well suited for rotomolding. For example, whilst not wishing to be bound by theory, it has been postulated that the high molecular weight "homopolymer" fraction may enhance the stiffness or modulus of the rotomolded parts. However, as may be expected, the physical properties of a finished part (which has been molded with a proper cycle time) are largely "set" by the molecular structure of the polyethylene copolymer used to prepare the part. This, in turn, often results in finished parts with a suboptimal balance of properties.

More recently, homogeneous ethylene copolymers have become commercially available. These homogenous copolymers have a uniform (or narrow) molecular weight distribution and a uniform comonomer distribution. This, in turn, causes the homogeneous copolymers to have a well-defined melting point (in comparison to the heterogeneous copolymers which have a melting point "range" or even multiple melting points).

The sharp melting point might have been expected to be advantageous for a rotomolding process. However, in practice, it has been found that parts prepared from a single homogeneous copolymer are prone to warpage and also generally have poor modulus or stiffness. Blends of homogeneous copolymers have been shown to mitigate this warpage problem, as disclosed in U.S. Pat. No. 7,201,864.

It is known to prepare storage containers for sulfuric acid by rotomolding polyethylene. These containers can become discolored after being exposed to sulfuric acid and the present disclosure provides embodiments that mitigate this discoloration problem.

One embodiment disclosed herein provides a method for improving the discoloration resistance of a rotational molded polyethylene container that is contacted with concentrated sulfuric acid, said method comprising the steps of 1) providing a stabilized ethylene copolymer composition, wherein said stabilized ethylene copolymer composition contains an additive package comprising
   A.1) a hindered phenolic primary antioxidant;
   A.2) a hydroxylamine primary antioxidant;
   B) a phosphite secondary antioxidant;
   C) a hindered amine light stabilizer; and
2) subjecting said stabilized ethylene copolymer composition to rotational molding conditions to produce a rotational molded polyethylene container; and
3) contacting said rotational molded polyethylene container with concentrated sulfuric acid to produce an acid contacted container;
   wherein said acid contacted container has improved color in comparison to a control acid contacted container that is prepared using an additive package that does not contain any of said hydroxylamine primary antioxidant.

In another embodiment, there is provided a method for improving the discoloration resistance of a rotational molded polyethylene container that is contacted with concentrated sulfuric acid, said method comprising the steps of 1) providing a stabilized ethylene copolymer composition, wherein said stabilized ethylene copolymer composition contains an additive package consisting essentially of A1) at least one hindered phenolic primary antioxidant (for example, from 300 to 1500 ppm of at least one hindered phenolic primary antioxidant);

A.2) at least one hydroxylamine primary antioxidant (for example, from 100 to 1000 ppm);

B) at least one phosphite secondary antioxidant (for example, from 500 to 2000 ppm);

C) at least one hindered amine light stabilizer (for example, from 500 to 5000 ppm);

2) subjecting said stabilized ethylene copolymer composition to rotational molding conditions to produce a rotational molded polyethylene container; and 3) contacting said rotational molded polyethylene container with concentrated sulfuric acid to produce an acid contacted container;

wherein said acid contacted container has improved color in comparison to a control acid contacted container that is prepared using an additive package that does not contain any of said hydroxylamine primary antioxidant.

The term "stabilized ethylene copolymer composition" simply refers to a composition that contains the ethylene copolymer composition plus the "additive package" (that serves to stabilize the ethylene copolymer composition).

Rotational molding technology is well known and is described in the literature. Reference may be made to U.S. Pat. No. 5,530,055 (Needham), for further details concerning the operation of a rotomolding process. Two important process conditions to define a rotomolding process are the molding temperature and "cook" time (or heated molding time). A temperature of from 230 to 350° C. and a heated molding time of from 10 to 60 minutes are suitable for use herein.

Ethylene copolymer compositions for use in this disclosure may be partially characterized by density and melt flow characteristics. In an embodiment, the density range is from 0.93 to 0.95 grams per cubic centimeter (for example, 0.935 to 0.945) and the melt index ("$I_2$", as determined by ASTM D-1238, using a 2.16 kilogram load at a temperature of 190° C.) is from 1 to 10 grams per 10 minutes (for example 2 to 8). Melt index might be regarded as an indicator of molecular weight, though an inverse relationship between the two exists. That is, as the molecular weight of the polymer increases, the flow index ($I_2$) decreases.

The term "ethylene copolymer", as used herein, is meant to refer to a copolymer of ethylene with at least one alpha olefin monomer containing from 3 to 10 carbon atoms. Thus, ethylene homopolymers are excluded but terpolymers are included. The physical properties of such ethylene copolymers are influenced by their molecular weight, molecular weight distribution, comonomer content and comonomer distribution. It is well known that the use of such comonomers produces copolymers that generally have decreased density and crystallinity as the amount of incorporated comonomer increases. The ethylene copolymers used in this disclosure may be either heterogenous copolymers or homogeneous copolymers as explained below.

Heterogenous Ethylene Copolymers (or "Heterogeneous Copolymers")

Conventional (heterogeneous) ethylene copolymers which are prepared with a conventional Ziegler-Natta (Z/N) catalyst generally have a comparatively broad molecular weight distribution (as defined by dividing weight average molecular weight, Mw, by number average molecular weight, Mn—i.e., molecular weight distribution equals Mw/Mn) and a broad comonomer distribution. These copolymers typically contain at least three distinct polymer fractions, namely a small amount (for example, less than 5 weight %) of a low molecular weight, high comonomer content material (also known as "wax"); a significant fraction (15 to 25 weight %) of material having a very high molecular weight and a low comonomer content (also known as "homopolymer"); with the remainder of the copolymer being of intermediate density and molecular weight.

This lack of uniformity with respect to molecular weight and comonomer distribution has several disadvantages, for example, the "wax" fraction may limit the use of these interpolymers in applications which come into contact with food and the "homopolymer" fraction is often associated with the poor impact resistance of goods made with these interpolymers. In addition, these heterogeneous copolymers have a molecular weight distribution, Mw/Mn, of greater than 3.0. However, these copolymers can also have good Environmental Stress Crack Resistance (ESCR) and are suitable for use herein.

Homogenous Ethylene Copolymers (or "Homogeneous Copolymers")

It is known to prepare rotomolded parts with a single "homogeneous" copolymer (i.e., a copolymer with a uniform comonomer distribution). Homogeneous copolymers do not contain the "high density" fraction which exists in conventional Ziegler Natta ("Z/N") copolymers and, thus, a homogeneous copolymer will have a lower (and sharper) melting point than a Z/N copolymer of similar molecular weight and density. This, in turn may allow cycle times to be reduced using a single homogeneous copolymer (in comparison to the cycle time required for similar Z/N copolymer). However, the resulting parts are prone to warpage. In addition, the rotomolded parts prepared from homogeneous copolymers have poor stiffness in comparison to parts prepared from Z/N copolymers. The well-defined melting point of the homogeneous copolymers may also assist with the fabrication of custom parts (in which thin molds with irregular shapes must be filled within tight tolerances).

The warpage problem may be mitigated by using ethylene copolymer compositions that may contain at least two ethylene copolymer blend components. Each of these components may be prepared by the copolymerization of ethylene with a $C_{4\ to\ 20}$ alpha olefin in the presence of a catalyst system which produces homogenous copolymers (i.e., as above, polymers with a narrow molecular weight distribution and narrow composition distribution). Exemplary catalyst systems include the vanadium catalyst system disclosed in U.S. Pat. No. 3,645,992 (Elston), "metallocene" catalysts (as disclosed, for example, in U.S. Pat. No. 5,324,800), "constrained geometry" catalysts (as disclosed, for example, in U.S. Pat. No. 5,064,802 Stevens et al.) and the phosphinimine catalyst systems described in the U.S. Pat. No. 6,372,864 (Brown et al.).

The blend components may be prepared as distinct polymers in separate polymerization reactions and then blended together to provide the present compositions. The blend components may be blended using conventional mixing/blending equipment such as a single or twin sinew extruder; and internal batch mixer such as a Banbury™ mixer; or a continuous mixer such as a Farrel™ mixer. The mixing time and temperatures may be readily optimized by those skilled in the art without undue experimentation. As a guideline, mixing temperatures of from 150 to 250° C. are suitable and mixing times of 1 to 10 minutes may provide satisfactory results. Alternatively (and, in some embodiments, preferably), the blend components may be prepared in a multiple reactor polymerization system.

Homogenous copolymers as described above are suitable for use herein.

Typically, each blend component is a copolymer of ethylene with $C_{4 \ to \ 8}$ alpha olefin such as butene-1, pentene-1, 4-methyl-1-pentene, hexene-1 or octene-1; with hexene-1 and octene-1 being most preferred in some embodiments.

Additives

Rotomolding compositions conventionally contain an additive package to protect the polymer from decomposing during the processing and/or exposure to the elements and to improve processing cycle times and windows. Reference is made to "Influence of Stabilizers in Rotational Molding" (Gupta and Stadler; paper presented at 22nd Annual Fall Meeting of the Association of Rotational Molders; 5-8 Oct. 1997) for details.

The additives may be incorporated into the compositions using mixing equipment such as an extruder, or internal batch mixer (also known as a Banbury™ mixer). The additive may be added "neat" (i.e., directly to the copolymer); as a "masterbatch" (i.e., by premixing the additives with a small amount of polyethylene which is subsequently mixed with the bulk of the composition); or as "preblends" (i.e., mixtures of the additives).

The additive systems useful in this disclosure include at least one Hindered Amine Light Stabilizers (or "HALS"); at least one secondary antioxidant that is, for example, a phosphite or phosphonite (for example, a diphosphite as illustrated in the examples); and at least two "primary" antioxidants, namely a hindered phenol and a hydroxyl amine.

In summary, the additive package described herein comprises at least four components, namely 1) a first primary antioxidant (Part 1, below); 2) a second primary antioxidant (Part 1); 3) a secondary antioxidant (Part 2); and 4) a hindered amine light stabilizer (Part 3).

Part 1. Primary Antioxidants

As used herein, the term primary antioxidant refers to a molecule which is capable of quenching free radicals in a polyethylene matrix. Examples of primary antioxidants include hindered phenols, hydroxylamines, amine oxides and lactones. Preferred embodiments of the present disclosure must use both a hindered phenol (See 1.1 and 1.4, below) and a hydroxylamine (1.5 below)—i.e., two primary antioxidants are required. Other primary antioxidants may optionally be included. Exemplary primary antioxidants are described in more detail in section 1 below.

1.1 Alkylated Mono-Phenols (Also Referred to as "Hindered Phenols")

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; 2,6-di-tert-butyl-4-methoxymethylphenol, Octadecyl-3-(3,5-di-tert-butyl-4-hydroxyphenyl)-propionate (e.g., IRGANOX™ 1076, from BASF); pentaerythritol tetrakis(3-(5-di-tert-butyl-4-hydroxyphenol)propionate) (e.g., IRGANOX™ 1010, from BASF); and 1,3,5-tris(3,5-di-tert-butyl-4-hydroxybenzyl)-1, 3,5-triazine-2,4,6(1H,3H,5H)-trione (e.g., IRGANOX™ 3114, from BASF).

1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols (Also Referred to as "Hindered Phenols")

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

1.5 Hydroxylamines

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine (e.g., IRGASTAB™ FS 042, from BASF). The analogous amine oxides (as disclosed in U.S. Pat. No. 5,844,029, Prabhu et al.) are also suitable.

Part 2. Secondary Antioxidants

The term secondary antioxidant refers to an additive that is used to scavenge peroxides. Examples include triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl)phosphite (e.g., IRGASTAB™ 168, from BASF); diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; tetrakis(2,4-di-tert-butylphenyl)4,4'-biphenylene and bis (2,4-dicumylphenyl) pentaerythritol diphosphite (e.g., DOVERPHOS™ S-9228, from Dover Chemicals) and sulfur compounds (for example, esters of betatriodipropionic acid) and dialkylsulfides. In some embodiment, phosphorus compounds are preferred, for example, the phosphites and phosphonites. A combination of more than one secondary antioxidant may be used.

In some embodiments, it is preferred to include a diphosphite (for example, DOVERPHOS™ S-9228) and a monophosphite (for example, IRGAFOS™ 168) as these additives may extend the "processing window" (i.e. allowing the part to remain in the mold for an extended period of time without becoming "overcooked" to the point of discoloration and/or the loss of physical properties). In some embodiments, the preferred amount of secondary antioxidant is from 100 to 3000 ppm.

Part 3. Hindered Amine Light Stabilizers

In some embodiments, a hindered amine light stabilizer (HALS) has a hindered amine functional group (which, may be for example, a tetramethyl piperidine group) together with an organic "structure" or "backbone" that is used to deliver the functional group to the polymer that is being stabilized. The number average molecular weight (Mn) of these HALS structures typically range from about 600 to about 15,000. HALS are well known items of commerce and are readily available from such suppliers as Ciba Specialty Chemicals and Cytec Incorporated.

Examples of HALS include bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxypiperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone). Some HALS (Hindered Amines Light Stabilizers) may be described as carboxylic acid 2,2,6,6-tetramethyl piperidinol esters (e.g., TINUUIN™ 622, form BASF and CYASORB™ UV-3346 from Cytec). Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam.

Additional details concerning suitable HALS for use in the present disclosure are disclosed in U.S. Pat. Nos. 5,037,870 and 5,134,181, the disclosures of which are incorporated herein by reference. In some embodiments, the preferred amount of HALS is from 300 to 3000 ppm.

Other Additives

Zinc Oxide

ZnO is widely used as a polyolefin additive. Any of the commercially available ZnO products which are presently used in polyolefins are potentially suitable for use herein. In some embodiments, preferred zinc oxide is prepared by the so called "French Process" and has a mean particle size of less than 1 micron. ZnO sold under the trademark "KADOX 911" is suitable. Representative physical properties of KADOX 911 ZnO are reported by the manufacturer as: a) mean particle size: 0.12 microns and b) surface area: 9.0 $m^2/g$.

Polyamide Stabilizers

For example, copper salts in combination with iodides and/or phosphorus compounds and salts of divalent manganese.

Basic Co-Stabilizers

For example, melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example, Ca stearate, calcium stearoyl lactate, calcium lactate, Zn stearate, Mg stearate, Na ricinoleate and K palmitate; antimony pyrocatecholate or zinc pyrocatecholate, including neutralizers such as hydrotalcites and synthetic hydrotalcites; and Li, Na, Mg, Ca, Al hydroxy carbonates.

Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate. Nucleating agents may improve stiffness of the rotomolded part.

Fillers and Reinforcing Agents

For example, calcium carbonate; silicates; glass fibers; asbestos; talc; kaolin; mica; barium sulfate; metal oxides and hydroxides; carbon black and graphite.

Miscellaneous

For example, plasticizers; UV absorbers; epoxidized vegetable oils, such as epoxidized soybean oils; lubricants; emulsifiers; pigments; optical brighteners; flame proofing agents; anti-static agents; blowing agents and thiosynergists, such as dilaurythiodipropionate or distearylthiodipropionate.

Crosslinkable rotomolded parts are contemplated. As disclosed in U.S. Pat. No. 5,367,025 (Needham) crosslinking agents may include a combination of organic peroxide initiator and a crosslinking co-agent. For rotomolding, dialkyl peroxides used include 2,5-dimethyl-2,5-di(t-butylperoxy)hexane or alpha,alpha'-bis(t-butylperoxy)diisopropylbenzene or those disclosed in U.S. Pat. No. 3,214,422. Co-agents used by those experienced in the art of crosslinking polyethylene, include triallyl cyanurate, triallyl isocyanurate, triallyl trimellitate, trimethololpropane trimethacrylate and related monomers.

EXAMPLES (Comparative) Example 1

Experimental procedures are described below:
Two different types of ethylene copolymer were used. One was prepared with a conventional Ziegler Natta (Z/N) catalyst and had a molecular weight distribution, Mw/Mn, of between 3.2 and 3.5. This is referred to in Table 1 as "ZN1" and it had a melt index, $I_2$, of 2 g/10 minutes and a density of 0.941 g/cc.

A "single site catalyst" (SSC) copolymer was also used and is identified as SSC1 in Table 1. SSC1 had a melt index, $I_2$, of 1.7 g/10 minutes and a density of 0.945 g/cc. In addition, SSC1 is further characterized by being a blend of two ethylene-octene blend components and was prepared in accordance with the teachings of U.S. Pat. No. 7,201,864 (Weber et al.).

These ethylene copolymers were blended with the additive packages described in Table 1 and ground into fine powder for the preparation of rotomolded parts. For clarification: the compounded copolymer used in experiment 2 was conventional polyethylene ZN1 and contained 300 ppm of primary antioxidant; 1200 ppm of secondary antioxidant (Irgafos 168) and 200 ppm of HALS. This composition is comparative because it does not contain hydroxylamine.

Rotomolded parts were then prepared in a rotational molding machine sold under the tradename Rotospeed RS3-160 by Ferry Industries Inc. The machine has two arms which rotate about a central axis. Each arm is fitted with a plate which rotates on an axis that is roughly perpendicular to the axis of rotation of the arm. Each plate is fitted with three cast aluminum molds that produce plastic cubes having dimensions of 12.5 inches (31.8 cm)×12.5 inches×12.5 inches. These molds produce parts having a nominal thickness of about 0.25 inches (0.64 cm) when initially filled with a standard charge of about 3.7 kg of ethylene copolymer.

A gas fired furnace which is capable of providing 2 million British thermal units (Btu) per hour is used to provide hot air that is circulated about the molds by a fan. The temperature within the enclosed oven is typically maintained at a temperature of between 230° C. (446° F.) and 350° C. (662° F.) for specified periods of time while the machine rotates the arms (typically, at about 8 revolutions per minute (rpm) and the plate (typically, at about 2 rpm). The compositions shown in Table 1 were "cooked" for a molding cycle of 40 minutes with an oven temperature of 440° F.

The "cooked parts" are then cooled by opening the oven. Water spray may also be used to facilitate cooling. "Cook times", rotation speed, temperatures and cooling cycles are computer controlled with appropriate software which also includes a data acquisition system.

Test plaques were cut from the molded cubes. The plaques were exposed to concentrated sulfuric acid (98% $H_2SO_4$) at 70° C. (As used herein, the term concentrated sulfuric acid refers to a liquid that contains from about 95 to 99% sulfuric acid by weight. In general, "concentrated sulfuric acid" in commercial use contains about 98% sulfuric acid).

The comparative compositions discolored after contact with the concentrated sulfuric acid. The following color scale is used to describe increasing levels of discoloration.

0—White
1—Tan
2—Light brown
3—Dark brown/grey
4—Black

Both of the compositions of this example were severely discolored (to black, number 4 on the above scale) after contact with concentrated sulfuric acid at 70° C. for 8 days.

TABLE 1

| Experiment | Copolymer | $MI_2$ (g/10 min) | Density (g/cm³) | HALS (ppm) | First Primary AO (ppm) | Secondary AO (ppm) | Second Primary AO (ppm) |
|---|---|---|---|---|---|---|---|
| 1 | SSC1 | 1.70 | 0.945 | C-944: 750<br>T-622: 750 | 0 | I-168: 550<br>S-9228: 450 | FS 042: 250 |
| 2 | ZN1 | 2.0 | 0.941 | C-3346: 2000 | I-3114: 300 | I-168: 1200 | 0 |

C-944 = Chimassorb ® 944;
T-622 = Tinuvin ® 622;
C-3346 = Cyasorb ® UV-3346.
I-3114 = Irganox ® 3114.
I-168 = Irgafos ® 168;
S-9228 = Doverphos ® S-9228.
⁵ FS 042 = Irgastab ® FS 042;

Both experiments 1 and 2 are comparative because each of the compositions only contained a single primary antioxidant—SSC1 contained only the hydroxylamine (sold under the trademark Irgastab FS042) and ZN1 contained only a phenolic (sold under the tradename Irganox 3114).

Example 2

The formulations shown in Table 2 were used in this example. The rotational molding procedures were similar to those described above except that the molding time was reduced to 34 minutes and the temperature was increased to 480° F. Test plaques were cut from the molded cubes and exposed to concentrated sulfuric acid (98 weight % $H_2SO_4$) at 70° C. for the times shown in Table 3. Color values are also presented in Table 3.

The data in Table 3 illustrate that the composition that was prepared with the two different primary antioxidants (namely a phenolic and a hydroxylamine) has improved resistance to discoloration

TABLE 2

Example 2 Formulations

| Experiment | Copolymer | $MI_2$ (g/10 min) | Density (g/cm³) | HALS (ppm) | First Primary AO (ppm) | Secondary AO (ppm) | Second Primary AO (ppm) |
|---|---|---|---|---|---|---|---|
| 10-C | ZN1 | 2.0 | 0.941 | C-3346: 2000 | I-3114: 300 | I-168: 1200 | 0 |
| 11-C | SS1 | 1.70 | 0.945 | C-944: 750<br>T-622: 750 | 0 | I-168: 550<br>S-9228: 450 | FS 042: 250 |

TABLE 2-continued

Example 2 Formulations

| Experiment | Copolymer | MI$_2$ (g/10 min) | Density (g/cm$^3$) | HALS (ppm) | First Primary AO (ppm) | Secondary AO (ppm) | Second Primary AO (ppm) |
|---|---|---|---|---|---|---|---|
| 12 | SS1 | 1.70 | 0.945 | C-944: 750 T-622: 750 | I-1076: 500 | I-168:550 S-9228: 450 | FS 042: 250 |

C-944 = Chimassorb ® 944;
T-622 = Tinuvin ® 622;
C-3346 = Cyasorb ® UV-3346.
[4] I-1076 = Irganox ® 1076;
I-3114 = Irganox ® 3114.
[5] I-168 = Irgafos ® 168;
S-9228 = Doverphos ® S-9228.
[6] FS 042 = Irgastab ® FS 042.
The composition of experiment 10 also contained 450 ppm of zinc stearate.
The compositions of experiments 11-13 also contained 750 ppm of zinc oxide.

TABLE 3

Color Values for Inside Surface of Parts

| | Exposure Time | | | |
|---|---|---|---|---|
| Experiment | 15 min | 60 min | 2 days | 4 days |
| 10-C | 0 | 0 | 0.5 | 1 |
| 11-C | 2 | 3 | 4 | 4 |
| 12 | 0 | 0 | 0 | 0.5 |

What is claimed is:

1. A method for improving the discoloration resistance of a rotational molded polyethylene container that is contacted with concentrated sulfuric acid, said method comprising the steps of
   1) providing a stabilized ethylene copolymer composition, wherein said stabilized ethylene copolymer composition contains an additive package comprising
      A.1) a hindered phenolic primary antioxidant;
      A.2) a hydroxylamine primary antioxidant;
      B) a phosphite secondary antioxidant;
      C) a hindered amine light stabilizer; and
   2) subjecting said stabilized ethylene copolymer composition to rotational molding conditions to produce a rotational molded polyethylene container; and
   3) contacting said rotational molded polyethylene container with concentrated sulfuric acid to produce an acid contacted container;
      wherein said acid contacted container has improved color in comparison to a control acid contacted container that is prepared using an additive package that does not contain any of said hydroxylamine primary antioxidant.

2. The method of claim 1 wherein said ethylene copolymer composition has a melt index, I$_2$, of from 1 to 10 grams per 10 minutes.

3. The method of claim 1 wherein said ethylene copolymer composition has a density of from 0.93 to 0.95 grams per cubic centimeter.

4. The method of claim 1 wherein said rotational molding conditions included a molding temperature of from 230 to 350° C. and a heated molded time of from 10 to 60 minutes.

5. The method of claim 1 wherein said ethylene copolymer composition is prepared from a catalyst type chosen from single site catalysts, Ziegler Natta catalysts and combinations thereof.

6. The method of claim 5 wherein said catalyst type consists essentially of at least one single site catalyst.

7. The method of claim 1 wherein said additive package consists essentially of
   A.1) at least one hindered phenolic primary antioxidant;
   A.2) at least one hydroxylamine primary antioxidant;
   B) at least one phosphite secondary antioxidant; and
   C) at least one hindered amine light stabilizer.

8. The method of claim 7 wherein said additive package consists essentially of:
   A.1) from 300 to 1500 ppm of at least one hindered phenolic primary antioxidant;
   A.2) from 100 to 1000 ppm of at least one hydroxylamine primary antioxidant;
   B) from 500 to 2000 ppm of at least one phosphite secondary antioxidant; and
   C) from 500 to 5000 ppm of at least one hindered amine light stabilizer.

* * * * *